United States Patent
Rose et al.

(10) Patent No.: US 9,605,621 B2
(45) Date of Patent: Mar. 28, 2017

(54) NOZZLE WITH GUIDING DEVICES

(71) Applicant: Rolls-Royce Deutschland Ltd & Co KG, Blankenfelde-Mahlow (DE)

(72) Inventors: Marco Rose, Freiberg (DE); Rene Spieweg, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 581 days.

(21) Appl. No.: 14/072,051

(22) Filed: Nov. 5, 2013

(65) Prior Publication Data

US 2014/0127010 A1    May 8, 2014

(30) Foreign Application Priority Data

Nov. 8, 2012 (DE) .................. 10 2012 220 358

(51) Int. Cl.
| | | |
|---|---|---|
| *F02K 1/46* | (2006.01) | |
| *F02K 1/38* | (2006.01) | |
| *F02K 1/48* | (2006.01) | |

(52) U.S. Cl.
CPC .............. *F02K 1/46* (2013.01); *F02K 1/386* (2013.01); *F02K 1/48* (2013.01); *F05D 2230/80* (2013.01); *F05D 2250/13* (2013.01); *F05D 2250/182* (2013.01); *F05D 2250/183* (2013.01); *F05D 2250/71* (2013.01); *F05D 2260/96* (2013.01); *Y02T 50/671* (2013.01)

(58) Field of Classification Search
CPC ............... F02K 1/46; F02K 1/48; F02K 1/386
See application file for complete search history.

(56) References Cited

U.S. PATENT DOCUMENTS

| | | | |
|---|---|---|---|
| 3,113,428 A | | 12/1963 | Herbert et al. |
| 3,514,955 A | * | 6/1970 | Judge ............ F02K 1/386 |
| | | | 137/605 |

(Continued)

FOREIGN PATENT DOCUMENTS

| | | |
|---|---|---|
| DE | 1915533 | 10/1969 |
| DE | 3826438 | 3/1989 |

(Continued)

OTHER PUBLICATIONS

European Search Report dated Jan. 27, 2016 for counterpart European application No. 13191623.1.

*Primary Examiner* — Woody Lee, Jr.
(74) *Attorney, Agent, or Firm* — Shuttleworth & Ingersoll, PLC; Timothy J. Klima (57) ABSTRACT

The present invention relates to a nozzle with a nozzle surface area and a nozzle rim, on which first and second guiding devices are alternatingly provided in the circumferential direction, where the first guiding devices are of the nozzle-type design and the second guiding devices are of the diffuser-type design. The first guiding devices each have a first azimuthal guide wall and two wall elements, with the first azimuthal guide wall forming a first trailing edge and two first edges to the wall elements. The second guiding devices each have a second azimuthal guide wall and two wall elements, with the second azimuthal guide wall forming a second trailing edge and two second edges to the wall elements. A wall element connects a first guiding device and a second guiding device. The wall elements have a curved course in the axial direction.

19 Claims, 8 Drawing Sheets

(56) References Cited

U.S. PATENT DOCUMENTS

| | | | |
|---|---|---|---|
| 3,982,696 A | 9/1976 | Gordon | |
| 4,487,017 A * | 12/1984 | Rodgers | F02K 1/386 181/220 |
| 4,813,230 A | 3/1989 | Braithwaite | |
| 6,276,127 B1 * | 8/2001 | Alberti | F02K 1/386 60/262 |
| 6,308,898 B1 | 10/2001 | Dorris et al. | |
| 6,360,528 B1 | 3/2002 | Brausch et al. | |
| 6,487,848 B2 | 12/2002 | Zysman et al. | |
| 6,505,706 B2 | 1/2003 | Tse | |
| 6,532,729 B2 | 3/2003 | Martens | |
| 6,606,854 B1 * | 8/2003 | Siefker | B63G 13/02 181/213 |
| 6,612,106 B2 | 9/2003 | Balzer | |
| 6,935,098 B2 * | 8/2005 | Bardagi | F02K 1/48 181/213 |
| 8,307,659 B2 | 11/2012 | Rose et al. | |
| 8,622,688 B2 * | 1/2014 | Presz, Jr. | F01D 9/04 415/4.3 |
| 2002/0125340 A1 | 9/2002 | Birch et al. | |
| 2002/0164249 A1 | 11/2002 | Strange, Jr. et al. | |
| 2003/0231777 A1 | 12/2003 | Butler et al. | |
| 2004/0255573 A1 * | 12/2004 | Rago | F02K 1/386 60/262 |
| 2010/0293958 A1 | 11/2010 | Girgis et al. | |
| 2011/0014038 A1 * | 1/2011 | Werle | F03D 1/04 415/200 |

FOREIGN PATENT DOCUMENTS

| | | |
|---|---|---|
| DE | 102007063018 | 6/2009 |
| EP | 0635632 | 1/1995 |
| EP | 0913567 | 5/1999 |
| EP | 0913568 | 5/1999 |
| EP | 0984152 | 3/2000 |
| EP | 2072193 | 6/2009 |
| EP | 2072793 | 6/2009 |
| GB | 2289921 | 12/1995 |
| GB | 2355766 | 5/2001 |
| GB | 2372779 | 9/2002 |
| WO | 2008025178 | 3/2008 |

* cited by examiner

NOZZLE WITH GUIDING DEVICES

CROSS-REFERENCE TO RELATED APPLICATION

This application claims the benefit of German Patent Application No. 10 2012 220 358.3 filed on Nov. 8, 2012 and is fully incorporated herein by reference.

BACKGROUND

This invention relates to a nozzle with guiding devices. A nozzle of this type is used for example in a gas turbine, in particular an aircraft engine, or in a burner, an ejector or a mixing nozzle of a process engineering system.

During take-off of an aircraft, the propulsive jet represents a considerable source of sound. Contributing to the generation of sound are stable and coherent swirl structures that form in the shear layers of the free jet. Numerous passive and active measures are known for reducing the jet noise.

The generic EP 2 072 793 A2 describes a nozzle with guiding elements, on the rim of which nozzle diffuser-type and nozzle-type guiding elements are alternatingly provided. The guiding elements form here trapezoids alternately converging and diverging in the flow direction. These guiding elements impart a swirl to the outflowing medium at the nozzle rim where the outflowing medium meets the surrounding medium. The resultant axial and radial swirls weaken the stable, coherent and noise-generating swirl structures and thus lead to reduced noise generation in the propulsive jet.

There is an ongoing need to provide a further reduction of the jet noise from aircraft while at the same time keeping aerodynamic losses low.

SUMMARY

An object underlying the present invention is to provide a nozzle with guiding elements that further reduce the sound emissions generated by the propulsive jet, while at the same time keeping aerodynamic losses low.

The solution in accordance with an exemplary embodiment of the invention therefore provides a nozzle with a nozzle surface area and a nozzle rim on which first and second guiding devices are alternately arranged in the circumferential direction. The first guiding devices are designed nozzle-like and form an open, converging duct. The second guiding devices are designed diffuser-like and form an open, diverging duct. To do so, the first guiding devices each have a first azimuthal guide wall and two guiding elements, with the first azimuthal guide wall forming a first trailing edge and two first edges to the wall elements. In the same way, the second guiding devices each have a second azimuthal guide wall and two guiding elements, with the second azimuthal guide wall forming a second trailing edge and two edges to the wall elements.

Each wall element connects a first guiding device and a second guiding device while forming part of both guiding devices. It is the case here that each wall element has a first edge to one of the first guide walls, a second edge to one of the second guide walls and a front-side trailing edge. The two edges of a wall element diverge in the axial direction.

It is provided in accordance with the invention that in a nozzle of this type the wall elements have a curved course in the axial direction. The course of the wall elements is thus not in the axial direction alone, but additionally has a component in the circumferential direction, the size of which depends on the axial position, i.e. is a function of the axial position (x).

The solution in accordance with the invention generates, due to the nozzle-type and diffuser-type guiding devices provided, local acceleration and deceleration of the flow exiting at the nozzle rim in the area of the jet outlet edge. This generates axial and radial swirls downstream of the nozzle, which interact with the stable annular swirls mainly responsible for generating noise. These swirls finally deform and dissipate. The large, low-frequency and noise-generating swirl structures are broken up into small swirl structures, with the high-frequency noise they emit being better absorbed atmospherically.

At the same time, the solution in accordance with the invention leads to a further decrease in the flow losses by an improved flow guidance at the inlet, at the trailing edge and at the wall elements and/or side walls of the guiding devices. As a result, a separation of the flow at the walls of the elements studied is delayed or even prevented. This leads to a reduction in the aerodynamic losses of the nozzle in accordance with the invention.

The solution in accordance with the invention is furthermore sturdy, weight-neutral and requires only low maintenance effort. It needs no moving parts, no control device and no separate energy supply, thus also making it inexpensive.

The nozzle in accordance with the invention can be used for all nozzle types, in particular also for a nozzle having a core flow nozzle and a bypass flow nozzle. The guiding devices can be an integral part of the nozzle or be fastened to the nozzle surface area subsequently as a retrofit kit.

It is pointed out that the statement that the wall elements have a curved course in the axial direction corresponds to the statement that the two edges of a wall element formed by the element with a first guide wall of a first guiding device and a second guide wall of a second guiding device have a curved course. With an exclusively radial arrangement of the wall elements, these two edges are one above the other in the radial direction. In the event that the wall elements run obliquely, in the sense that they additionally have a component in the circumferential direction, the curved edges are by contrast spaced apart in the circumferential direction.

In accordance with an exemplary embodiment of the invention, the wall elements adjoining the nozzle surface area run in the axial direction substantially in a straight line, i.e. the inlet curvature is as small as possible or equal to zero. This means that the wall elements are substantially perpendicular to the edge defining the transition from the nozzle surface area to the guiding devices.

A further exemplary embodiment of the invention provides that the wall elements adjoining at their front-side trailing edge in the axial direction run substantially in a straight line. In this case, the outlet curvature of the wall elements at the rear edge in the flow direction is likewise as small as possible or equal to zero. In an alternative embodiment, however, it can be provided that the wall elements have a curvature which assumes a finite value adjoining the front-side trailing edge. The outlet curvature of the wall elements is in this case unequal to zero. In accordance with the two design variants stated, the wall elements can therefore be at an angle equal to 90° or different from 90° relative to the trailing edges of the guiding devices.

A first combination of the stated courses leads to an embodiment in which the wail elements adjoining the nozzle surface area and adjoining its front-side trailing edge run substantially in a straight line in the axial direction and in a curved line between those areas. A nozzle-type flow duct therefore has in the axial direction initially a constant width, then a tapering width and adjoining the trailing edge once again a constant width, with the term "width" relating to the circumferential direction. In corresponding manner, a diffuser-type flow duct in the axial direction initially has a constant width, then a divergent width and adjoining the trailing edge once again a constant width.

The wall elements effect in the case of this exemplary embodiment a flow guidance at the inlet and at the outlet edge substantially in the axial direction, while between the edges it has a curvature. in this connection, it can be provided that the trailing edge has a turning point in its curvature.

A second combination of the courses mentioned leads to an embodiment in which the wall elements run in a straight line only adjoining the nozzle surface area, and in their further course have a curvature downstream. This curvature is, in accordance with an exemplary embodiment, such that the curvature drops to zero at a turning point of the wall elements and subsequently assumes a finite value, so that at the trailing edge a curvature is unequal to zero. The nozzle-type flow duct thus has in the axial direction initially a constant width and then a tapering width, where an outflow angle unequal to zero is achieved at the trailing edge. In corresponding manner, a diffuser-type flow duct in the axial direction initially has a constant width, then a divergent width, where an outflow angle unequal to zero is achieved at the trailing edge.

In accordance with a further design variant, the wall elements are always curved in their axial course between a starting point adjoining the nozzle surface area and their front-side trailing edge, i.e. the wall elements do not extend tangentially at their front-side trailing edge, but have a curvature there too. Accordingly, a nozzle-type flow duct has a width which, starting from an initial width, is continually reduced in the axial direction. In corresponding manner, a diffuser-type flow duct has a width which, starting from an initial width is continually increased in the axial direction. The degree of the curvature can vary depending on the axial position (x), where differing courses could be provided.

In accordance with an exemplary embodiment of the invention, it is provided that the product from the amount of the maximum curvature k of the wall elements with the diameter of the nozzle rim is in the range between 0.002 and 0.05. The following thus applies: $k*d=0.002-0.05$. This means, when an assumed diameter d at the nozzle outlet is for example 1 m, that the curvature radius, which is the reciprocal value of the curvature, is in the range between 20 m and 500 m. The overall curvature is thus relatively low and does not necessarily lead to it being detectable to the human eye.

In accordance with a further exemplary embodiment, the quotient of length l of the guiding devices to width b of the guiding devices is in the range between 0.2 and 1. The following thus applies: $l/b=0.2-1.0$.

A further exemplary embodiment provides that the relative pitch of the nozzle elements on the nozzle circumference, i.e. the quotient of width b of the guiding devices to diameter d of the nozzle rim, is in the range between 0.15 and 0.6. The following applies: $b/d=0.15-0.6$. The term "width" of the guiding devices relates here to a pair of adjacent wall elements.

In the nozzle in accordance with the invention, adjacent wall elements converge and diverge alternately and in pairs in the axial direction. A wall element studied thus forms with its one neighbour a convergent duct and with its other neighbour a divergent duct. The curved course of the wall elements here leads to the convergence increasing in the curved area of the nozzle-type guiding devices due to the curvature, while divergence increases in the curved area in the case of the diffuser-type guiding devices.

The wall elements, which each connect a first guiding device and a second guiding device to one another, run in accordance with one design variant in the radial direction, i.e. they are aligned perpendicular to the nozzle surface area. However, it can also be provided in alternative design variants that the wall elements run obliquely, having a radial component and a component in the circumferential direction. An oblique arrangement of the wall elements leads to a narrowing or widening in the radial direction of the ducts provided by the first and second guiding devices. This can lead to additional swirling at the nozzle rim.

The first and the second guide walls can be inclined relative to the flow direction at the nozzle rim in different ways. To do so, it can in particular be provided that the first guide walls are inclined radially outwards and the second guide walls are inclined radially inwards, or vice versa. This means that the guiding devices of the nozzle-type design are aligned inwards, i.e. to the jet, and the diffuser-type guiding devices outwards to the surrounding flow, or that the diffuser-type guiding devices are aligned inwards i.e. to the jet, and the nozzle-type guiding devices outwards to the surrounding flow.

BRIEF DESCRIPTION OF THE DRAWINGS

The present invention is described in the following in more detail with reference to the accompanying drawing, showing several exemplary embodiments.

DETAILED DESCRIPTION

Figure 6:
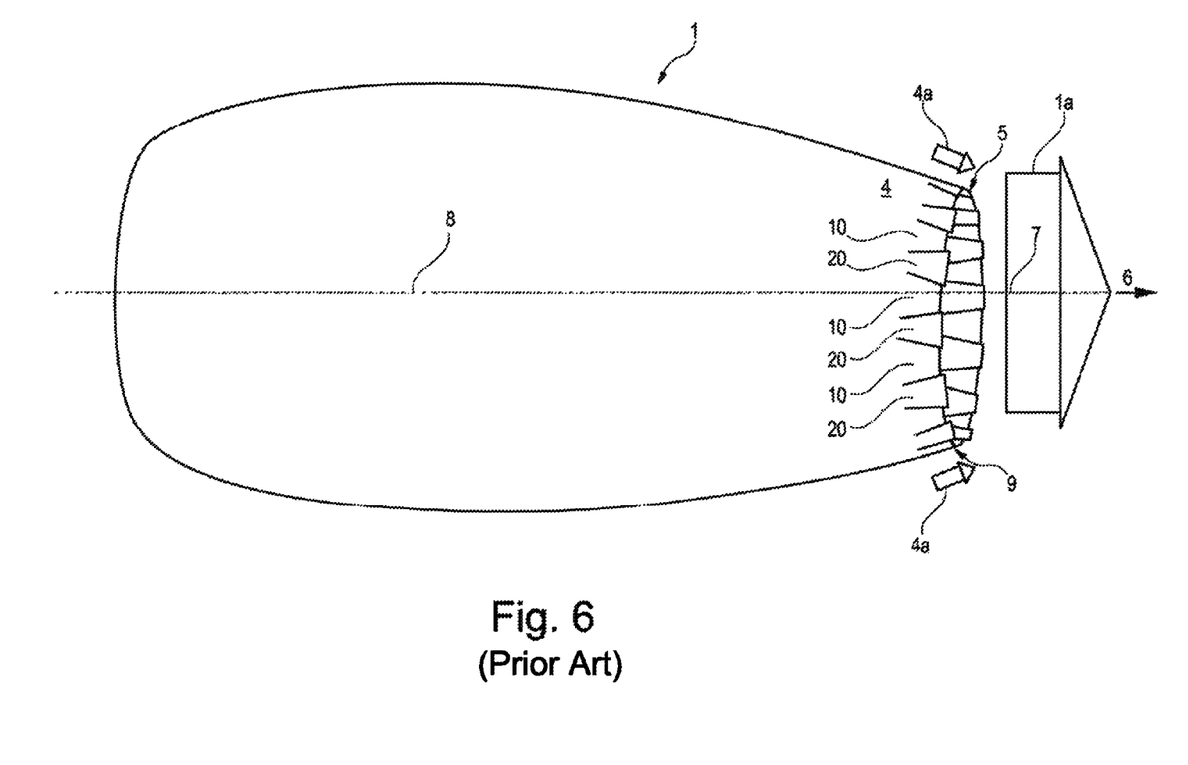
FIG. 6 shows a perspective and schematic view of a first exemplary embodiment of a nozzle with first and second guiding devices in accordance with the state of the art.
Figure 7:
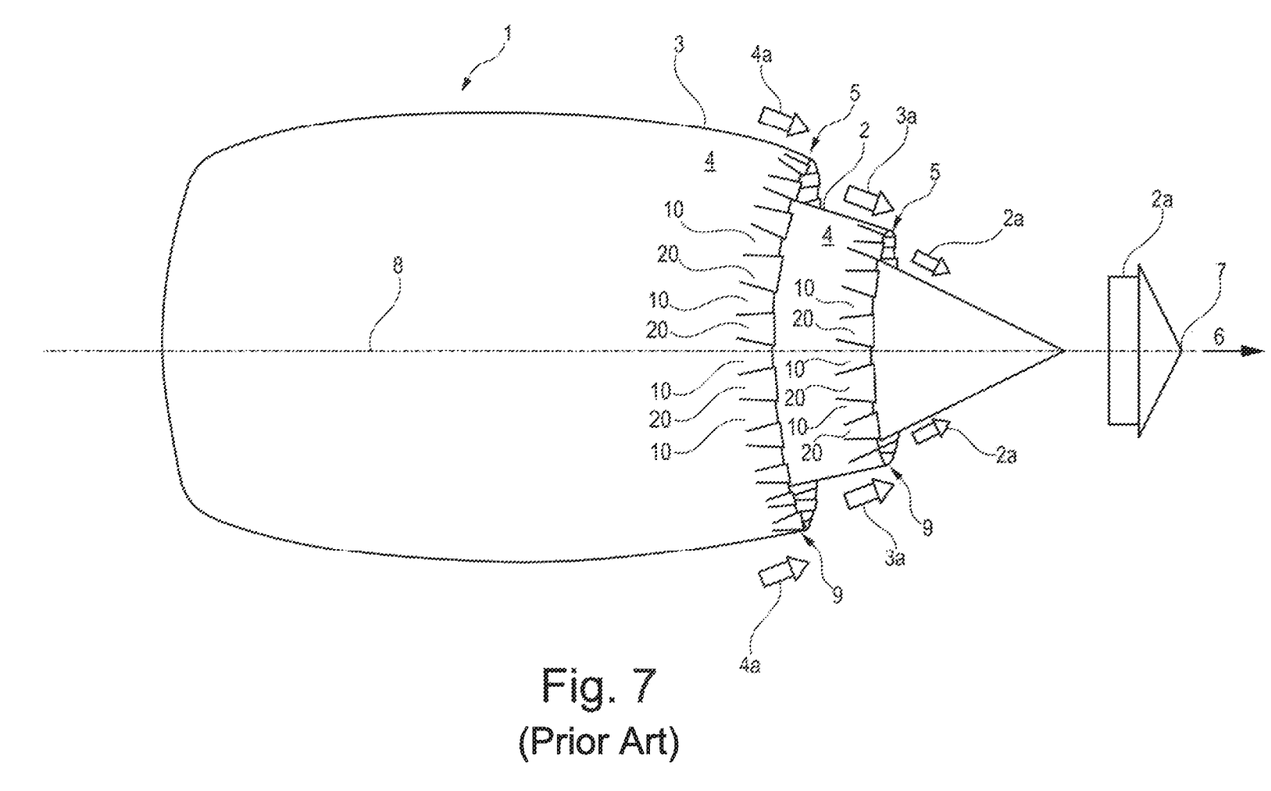
FIG. 7 shows a perspective and schematic view of a second exemplary embodiment of a nozzle in accordance with the state of the art.

For a better understanding of the background of the present invention, two embodiments of a nozzle with first and second guiding devices in accordance with the state of the art are initially explained on the basis of FIGS. 6 and 7.

FIG. 6 shows a nozzle 1 with a nozzle surface area 4 as well as first guiding devices 10 and second guiding devices 20 provided on a nozzle rim with a jet outlet edge 5. The first guiding devices 10 converge in the flow direction 6 and are inclined radially inwards, while the second guiding devices 20 diverge in the flow direction 6 and are inclined radially outwards. A reversed design is also possible. The jet axis 7 forms in the flow direction 6 an extension of the center line 8 of the nozzle 1. The center line 8 of the nozzle can be identical to the center line of the turbine (as shown), but can also slightly differ from it.

In operation, a propulsive jet 1a exits the nozzle at the jet outlet edge. An outer flow 4a passes along the nozzle surface area 4.

FIG. 7 shows a nozzle 1 including a core flow nozzle 2 and a bypass flow nozzle 3. The core flow nozzle 2 and the bypass flow nozzle 3 each have a nozzle surface area 4 with a jet outlet edge 5 as well as first guiding devices 10 and second guiding devices 20 at nozzle rims 9 with associated jet outlet edges 5. As in FIG. 3, the first guiding devices 10 converge in the flow direction 6 and are inclined radially inwards, while the second guiding devices 20 diverge in the flow direction 6 and are inclined radially outwards. Alternatively, the first guiding devices 10 are inclined radially outwards and the second guiding devices 20 radially inwards. The jet axis 7 forms in the flow direction 6 an extension of the center line 8 of the nozzle 1. The center line 8 of the nozzle can be identical to the center line of the turbine (as shown), but can also slightly differ from it.

In operation, a hot core flow 2a exits the core flow nozzle in the exemplary embodiment of FIG. 7. A cold bypass flow 3a exits the bypass flow nozzle 3. The outer flow 4a passes along the nozzle surface area 4 of the bypass flow nozzle 3.

An arrangement corresponding to FIGS. 6 and 7 is described in EP 2 072 793 A2, to which reference is made additionally.

Figure 1:
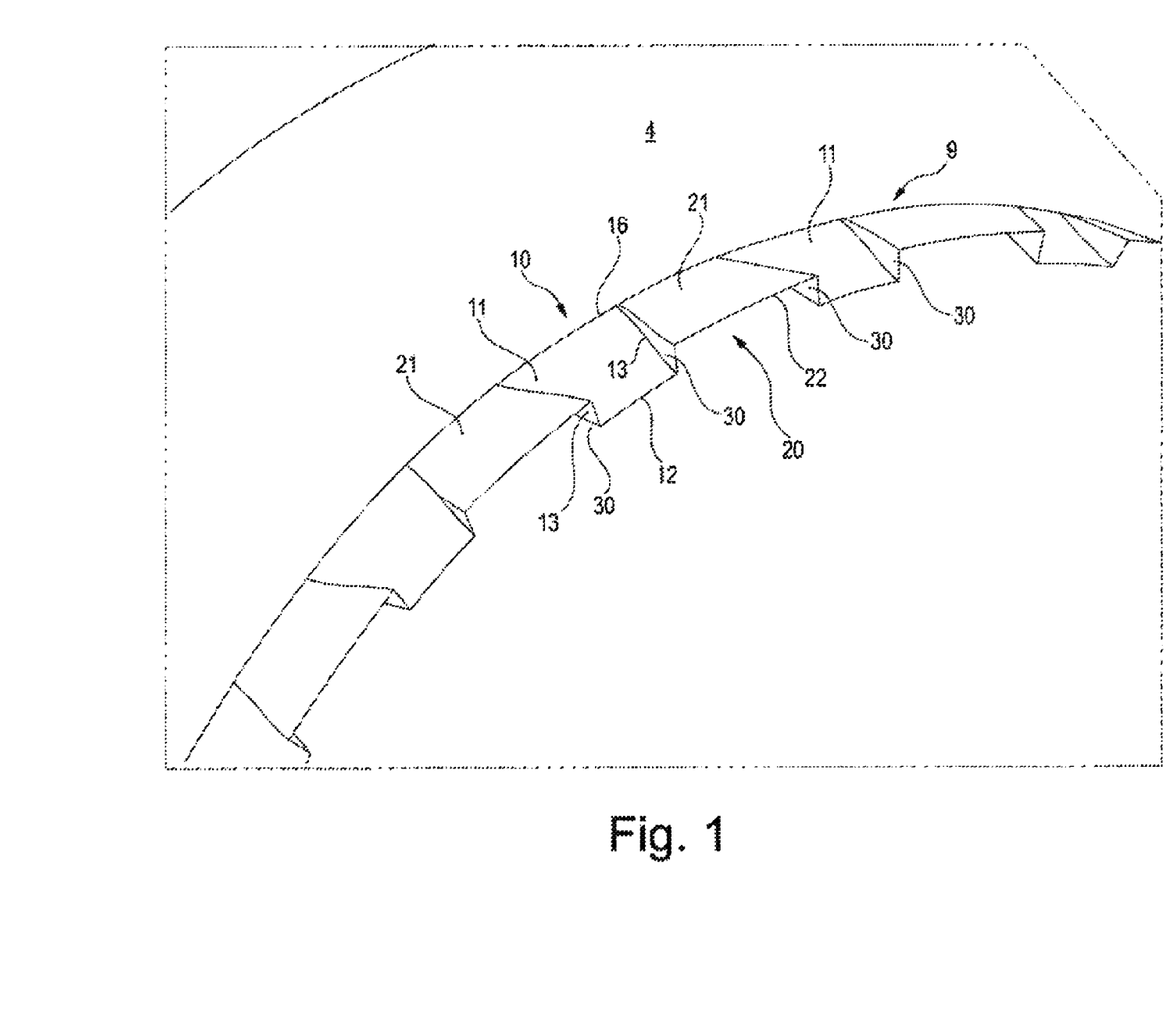
FIG. 1 shows a first exemplary embodiment of first and second guiding devices of a nozzle in accordance with the present invention.

FIG. 1 shows a first exemplary embodiment of a nozzle rim designed in accordance with the invention, having first nozzle-type guiding devices 10 and second diffuser-type guiding devices 20, which are designed for decreasing flow losses in a different way than in accordance with FIGS. 6 and 7.

Figure 2:
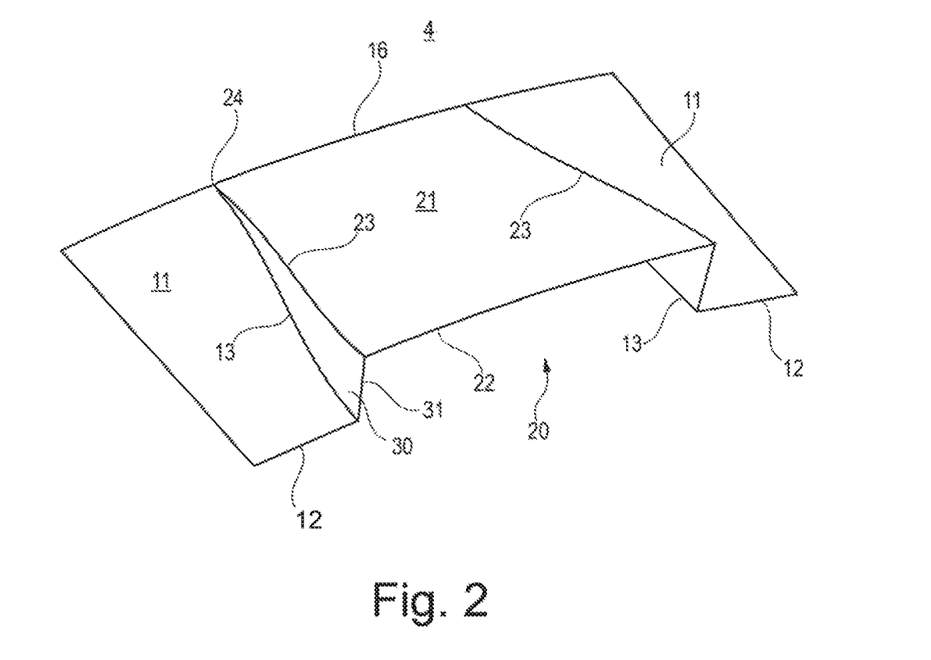
FIG. 2 shows a perspective detail view of first and second guiding devices of the nozzle of FIG. 1.

In accordance with FIGS. 1 and 2, the nozzle rim 9 is formed from first guiding devices 10 and second guiding devices 20. The first guiding devices 10 form a nozzle-type duct and the second guiding devices 20 a diffuser-type duct. To do so, the first guiding devices 10 each include a (first) azimuthal guide wall 11 and two adjoining wall elements 30 (first wall element 30a and second wall element 30b-see FIG. 3) adjacent to it in the circumferential direction. The azimuthal guide wall 11 is delimited here by four limiting lines or edges. A first edge running azimuthally and axially at the front when seen in the flow direction is formed by an edge 16 running in the circumferential direction, adjoining the nozzle surface area 4 and defining the start of the guiding elements 10, 20 in the axial direction. A second edge running azimuthally and axially at the rear when seen in the flow direction is formed by a (first) trailing edge 12. The first guiding device 10 furthermore includes two lateral edges 13, i.e. spaced apart in the circumferential direction. The edges 13 form edges to the wall elements 30 and at the same time limits to the azimuthal guide wall 11.

The second guiding devices 20 also include a (second) azimuthal guide wall 21 and two wall elements 30 (first wall element 30a and second wall element 30b). The azimuthal guide wall 21 is here defined by four limiting lines or edges. A first edge, which is axially at the front, is formed by the edge 16 running in the circumferential direction. A second edge, which is axially at the rear, is formed by a (second) trailing edge 22. Furthermore two lateral edges 23 are provided to the wall elements 30.

The wall elements 30 each connect a first guiding device 10 and a second guiding device 20 to one another and are also part of both guiding devices 10, 20 in that each wall element 30 has a first edge 13 to one of the first guide walls 11 and a second edge 23 to one of the second guide walls 21. Each wall element 30 furthermore includes a front-side trailing edge 31. The two edges 13, 23 of a wall element diverge in the axial direction.

It is pointed out that the first guiding devices 10 are inclined radially inwards and the second guiding devices 20 radially outwards relative to the flow direction. However, an opposite alignment of the guiding devices 10, 20 is also possible.

It is provided that the wall elements 30 have a curved course in the axial direction, i.e. do not extend in a straight line between the edge 16 and the front-side trailing edge 31. Instead, the edges 13, 23 of the wall elements 30 have a curvature, with the degree of curvature in the curve they define depending on the axial position (x), which is the same as the flow direction.

In this connection, it is provided in the exemplary embodiment of FIG. 2 that the wall elements 30 adjoining a starting point 24 which adjoins the edge 16 and adjoining the front-side trailing edge 31 run substantially in the axial direction, i.e. in the flow direction. Between these ends, the wall element 30 has by contrast a curved course, which in the exemplary embodiment of FIG. 2 has a turning point about half-way between the point 24 and the trailing edge 31. In the area of the turning point, the curvature is equal to zero.

Figure 3:
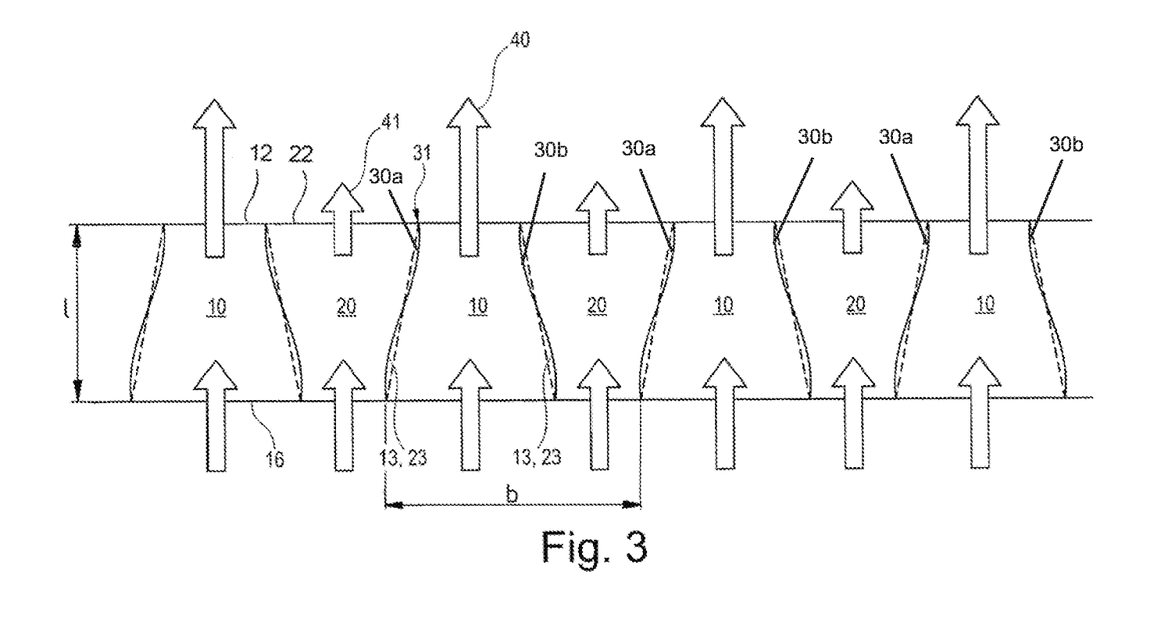
FIG. 3 shows a top view onto the nozzle rim developed in the circumferential direction of a nozzle with first and second guiding devices in accordance with the FIGS. 1 and 2.

FIG. 3 shows the corresponding flows at nozzle-type and diffuser-type guiding devices 10, 20. First of all, it can be readily seen that the edges 13, 23 each differ from a straight-lined course—shown as a dashed line—and have a zero curvature approximately in the middle between the edge 16 and the trailing edge 31.

It can furthermore be discerned that the nozzle-type guiding devices 10 and the diffuser-type guiding devices 20 at the nozzle rim effect local acceleration or deceleration of the flow exiting from the nozzle rim, as indicated schematically by arrows 40 indicating the nozzle flow and arrows 41 indicating the diffuser flow.

The guiding elements 10, 20 each have a length l in the axial direction and a width b in the circumferential direction. The width of two adjoining guiding devices 10, 20 in the area of the edge 16, at the front in the flow direction, is designated as width b in accordance with FIG. 3.

The inlet curvature of the edges 13, 23 at the edge 16 is as small as possible or equal to zero, i.e. the edges 13, 23 are perpendicular to the edge 16. The outlet curvature of the edges 13, 23 at the edge 12, 22, which is axially at the rear, can be equal to zero or can differ from zero. The angle of the edges 13, 23 to the edge 12, 22 can thus be 90° (with an outlet curvature of zero) or different from 90° (with an outlet curvature unequal to zero).

Figure 3A:
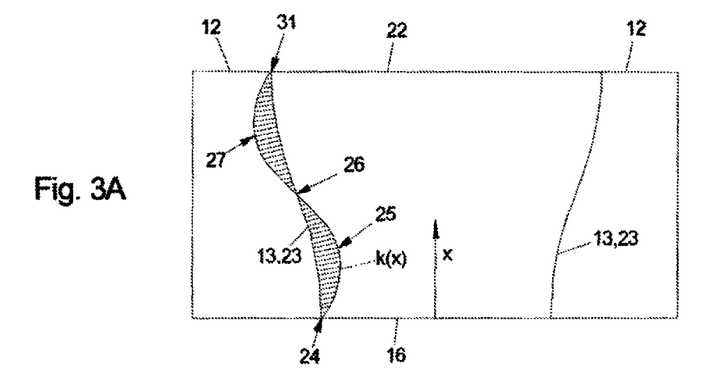
FIG. 3A shows a first exemplary embodiment for the course of a curvature with a guiding device in accordance with FIG. 3.
Figure 3B:
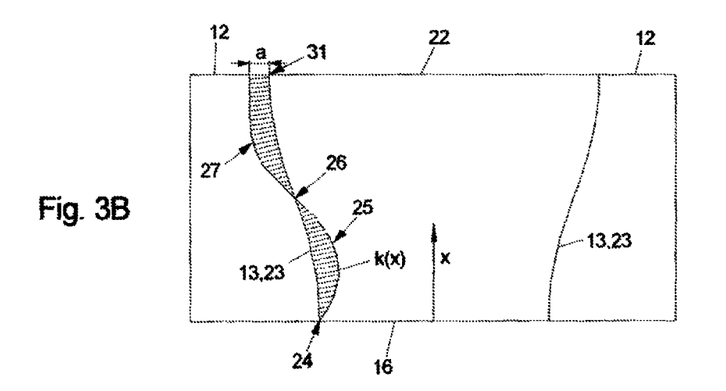
FIG. 3B shows a second exemplary embodiment for the course of a curvature with a guiding device in accordance with FIG. 3.
Figure 3C:
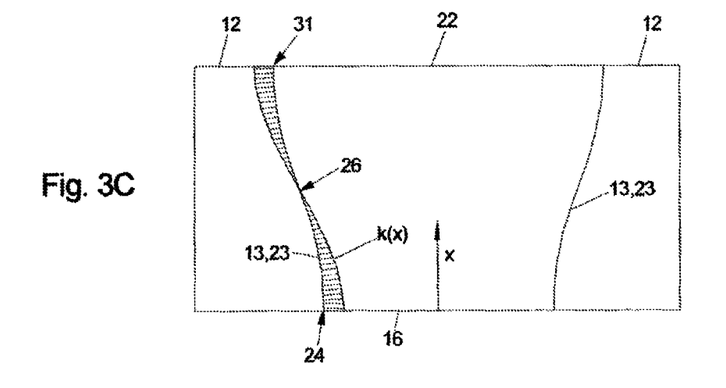
FIG. 3C shows a third exemplary embodiment for the course of a curvature with a guiding device in accordance with FIG. 3.

FIGS. 3A to 3C show three different exemplary embodiments for the precise course of the curvature in FIG. 3 along the edges 13, 23, and hence along the wall elements 30 delimited by the edges 13, 23.

FIG. 3A shows the edges 13, 23 of the guiding elements using the example of a guiding device 20 forming a diffuser-type duct. In addition to the edges 13, 23, the curvature k(x) is stated as a function of the axial position x. The amount of the curvature is indicated here by the distance of the curve k(x) from the edges 13, 23, and therefore corresponds to the length of the connecting lines between the two curves 13, 23 and k (x) stated in FIG. 3A.

It can be seen that the curvature at the starting point 24 adjoining the edge 16 is equal to zero. The curvature then increases up to a maximum 25, which is at approximately a quarter of the distance between the front edge 16 axially and the rear edge 22 axially, and is then reduced to the value zero up to a turning point 26 of the wall course, with the turning point of the wall course being approximately half way between the front edge 16 in the axial direction and the rear edge 22 in the axial direction, and then increasing in the negative range up to a negative maximum 27 which is approximately three quarters of the distance between the front edge 16 in the axial direction and the rear edge 22 in the axial direction, and then decreasing back to zero at the trailing edge 31, which is in the same plane as the edges 22 and 12, cf. FIGS. 1 and 2.

FIG. 3A thus shows an exemplary embodiment for the course of a curvature in which the edges 13, 23 and hence the wall element 30 undergo a turning point in their curvature, where the curvature is equal to zero at the turning point 26. FIG. 3A also shows an exemplary embodiment in which both the inlet curvature in the area of the edge 16 and the outlet curvature in the area of the edge 22, 12 are equal to zero, so that the edges 13, 23 are perpendicular to the respective edges 16, 22, 12.

FIG. 3B shows an alternative exemplary embodiment differing from the exemplary embodiment of FIG. 3A in that the curvature adjoining the front-side trailing edge 31 assumes a finite value a. i.e. the angle of the edges 13, 23 to the edge 12, 22 is unequal to 90°. FIG. 3B thus shows an exemplary embodiment in which only the inlet curvature of the edges 13, 23 at the edge 16 is equal to zero, while the outlet curvature of the edges 13, 23 at the edges 12, 22 differs from zero.

FIG. 3C shows an alternative exemplary embodiment, where both, the inlet curvature of the edges 13, 23 at the edge 16 and the outlet curvature of the edges 13, 23 at the edges 12, 22 differs from zero.

The curvature then decreases at the edge 16 up to the turning point 26 of the wall course and then increases again.

It is pointed out that the differing curvatures in the course as shown of the edges 13, 23 in FIGS. 3A, 3B, 3C cannot be discerned, since the curvature in the exemplary embodiments shown has low values. It is thus provided that the amount of the maximum curvature k relative to the diameter d of the nozzle outlet is defined as follows: k/d=0.002 to 0.05. With a typical diameter d of 1 m at the nozzle outlet, this means that the curvature radius, which is equal to the reciprocal value of the curvature, is between 20 m and 500 m.

Figure 4:
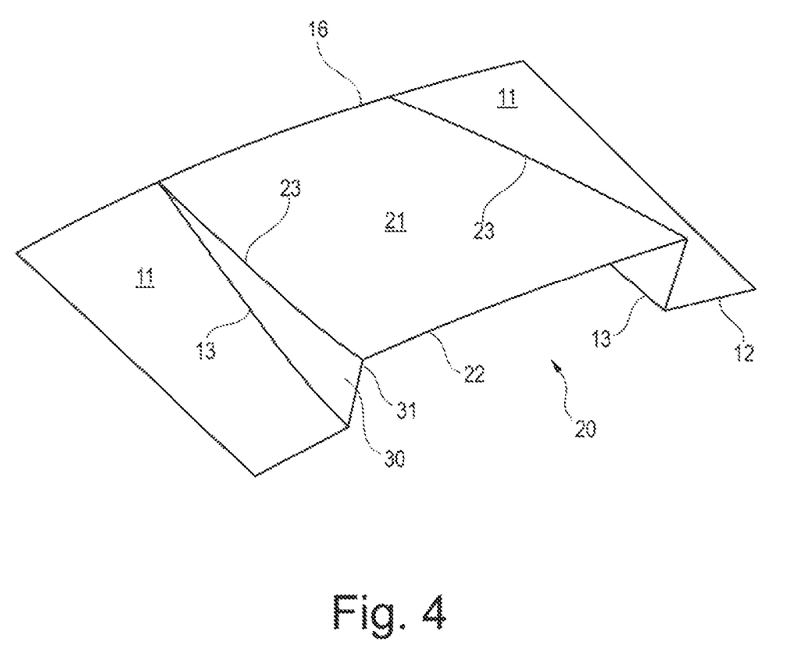
FIG. 4 shows a perspective detail view of first and second guiding devices of a second exemplary embodiment of a nozzle in accordance with the present invention.
Figure 5:
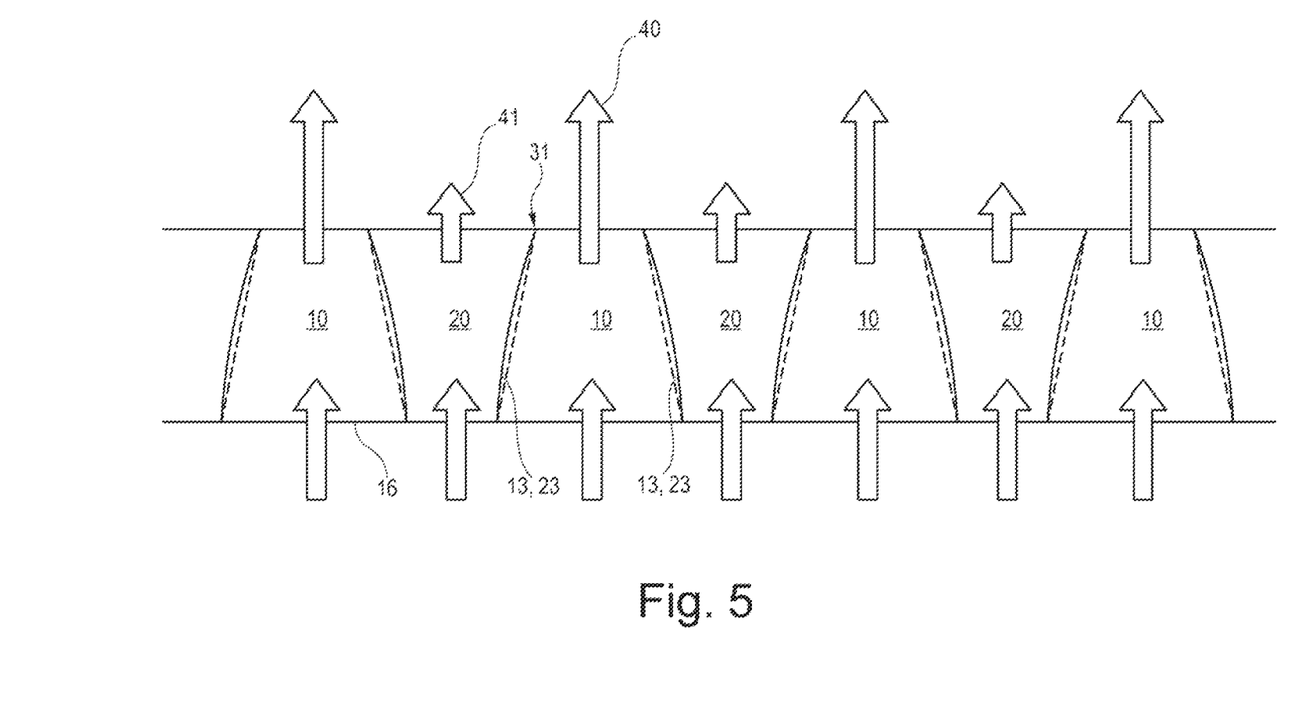
FIG. 5 shows a top view onto the nozzle rim developed in the circumferential direction of a nozzle with first and second guiding devices in accordance with FIG. 4.

FIGS. 4 and 5 show an alternative exemplary embodiment in which the wall elements 30 starting from the edge 16 are steadily curved. The degree of curvature can here be substantially constant (as shown in FIGS. 4 and 5), but alternatively also vary depending on the axial position (x). The wall course of the wall elements 30 has no turning point in this embodiment, i.e. the curvature is always lower than or greater than zero.

The exemplary embodiments of FIGS. 1-3, 3A, 3B, 3C and 4-5 can be varied to the effect that the wall elements 30 do not run in the radial direction, i.e. are perpendicular to the nozzle surface area 4, as shown in the Figures, but have an oblique form with a radial component and a component in the circumferential direction.

The invention is not restricted in its design to the exemplary embodiments set forth above, which must be understood only as examples. The angle and size ratios as shown of the first and second guiding devices must therefore only be understood as examples. It can also be provided that the trailing edges 12, 22 do not run in the circumferential direction, unlike as shown in the figures, but obliquely to the circumferential direction. It can also be provided that the first and second azimuthal guide walls have a different axial length.

The invention claimed is:

1. A nozzle comprising:
   a nozzle surface area,
   a nozzle rim,
   the nozzle rim including a plurality of first and second guiding devices alternatingly provided in a circumferential direction,
   the first guiding devices each including a converging nozzle shape,
   the second guiding devices each including a diverging diffuser shape,
   the first guiding devices each including a first azimuthal guide wall, and a first wall element and a second wall element positioned respectively on opposite sides of the first azimuthal guide wall, with the first azimuthal guide wall forming a first trailing edge and two first lateral edges, one each to the first and second wall elements,
   the second guiding devices each including a second azimuthal guide wall and sharing 1) the first wall element with one of the first guiding devices positioned on one side of the second azimuthal guide wall and 2) the second wall element with one of the first guiding devices positioned on an opposite side of the second azimuthal guide wall, with the second azimuthal guide wall forming a second trailing edge and two second lateral edges, one each to the shared first and second wall elements,
   wherein each of the first and second wall elements includes one of the first lateral edges, one of the second lateral edges diverging from the one of the first lateral edges in an axial direction of the nozzle, and a front-side trailing edge, and
   the wall elements each including a curved course in the axial direction;
   wherein, in an axial course of each wall element between a starting point adjoining the nozzle surface area and the front-side trailing edge, the curved course includes an inflection point;
   wherein a product from an amount of the maximum curvature of the wall elements with a diameter of the nozzle rim is in a range between 0.002 and 0.05.

2. The nozzle in accordance with claim 1, wherein portions of the wall elements adjoining the nozzle surface area run in the axial direction substantially in straight lines.

3. The nozzle in accordance with claim 1, wherein portions of the wall elements adjoining the front-side trailing edges run in the axial direction substantially in straight lines.

4. The nozzle in accordance with claim 1, wherein the curved course assumes a finite value adjoining the front-side trailing edge.

5. The nozzle in accordance with claim 1, wherein end portions of the wall elements adjoining the nozzle surface area and adjoining the front-side trailing edges run substantially in straight lines in the axial direction and middle portions between the end portions run in curved lines.

6. The nozzle in accordance with claim 4, wherein the wall elements run substantially in straight lines in the axial direction in portions adjoining the nozzle surface area and then in curved lines, with curvatures adjoining the front-side trailing edge assuming finite values.

7. The nozzle in accordance with claim 1, wherein the wall elements are always curved in their axial course between starting points adjoining the nozzle surface area up to the inflection points and from the inflection points to their front-side trailing edges.

8. The nozzle in accordance with claim 1, wherein a quotient of a length of the guiding devices in the axial direction to a width of the guiding devices in the circumferential direction is in a range between 0.2 and 1.

9. The nozzle in accordance with claim 1, wherein a quotient of a width of the guiding devices in the circumferential direction to a diameter of the nozzle rim, which quotient defines a relative pitch of the guiding devices on a nozzle circumference, is in a range between 0.15 and 0.6.

10. The nozzle in accordance with claim 1, wherein adjacent wall elements converge and diverge alternately and in pairs in the axial direction.

11. The nozzle in accordance with claim 1, wherein the wall elements are aligned in a radial direction.

12. The nozzle in accordance with claim 1, wherein the wall elements run obliquely, having a radial component and a component in the circumferential direction.

13. The nozzle in accordance with claim 1, wherein the first and second guide walls are inclined relative to the flow direction at the nozzle rim in different ways.

14. The nozzle in accordance with claim 1, wherein the first azimuthal guide walls are inclined radially inwards and the second azimuthal guide walls are inclined radially outwards, or vice versa.

15. The nozzle in accordance with claim 1, wherein at least one chosen from the first guiding devices and the second guiding devices are made from segments of the nozzle surface area.

16. The nozzle in accordance with claim 1, wherein at least one chosen from the first guiding devices and the second guiding devices are provided as a retrofit kit and fastened to the nozzle surface area.

17. The nozzle in accordance with claim 1, wherein at least one chosen from some of the first trailing edges of the first azimuthal guide walls and some of the second trailing edges of the second azimuthal guide walls run obliquely to the circumferential direction.

18. The nozzle in accordance with claim 1, wherein at least some of the first azimuthal guide walls of the first guiding device and at least some of the second azimuthal guide walls of the second guiding device have a different axial length, such that their first and second trailing edges have a different axial position.

19. A gas turbine having a nozzle in accordance with claim 1.

* * * * *